(No Model.)
N. G. SWIFT.
FARM GATE.
No. 356,178. Patented Jan. 18, 1887.
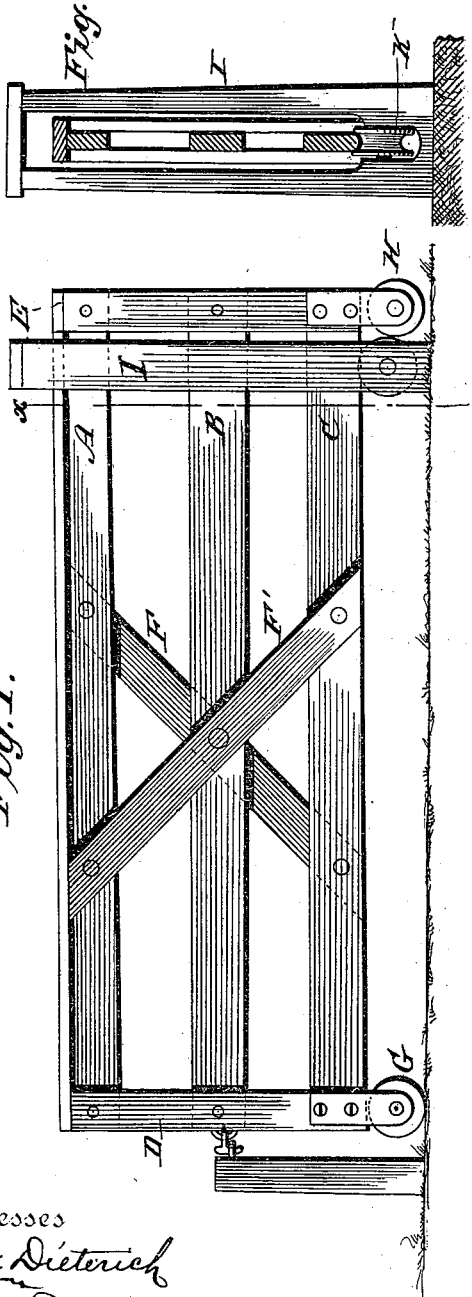
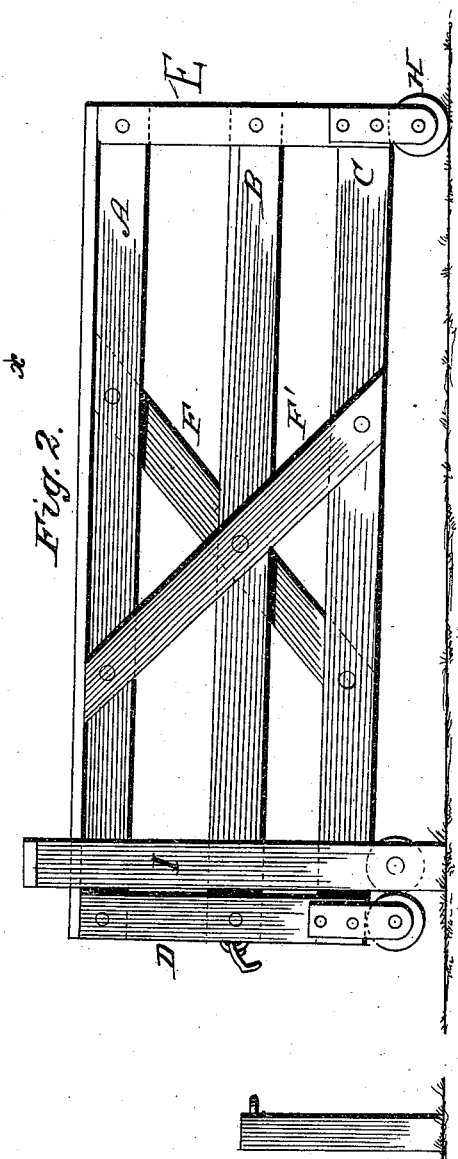
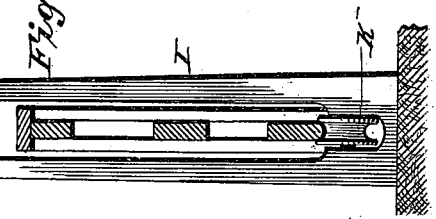
Witnesses
Fred G. Dieterich
W. S. Odell
Inventor
Nathan G. Swift
By his Attorney
Daniel Breed

United States Patent Office.

NATHAN G. SWIFT, OF MILLBROOK, NEW YORK.

FARM-GATE.

SPECIFICATION forming part of Letters Patent No. 356,178, dated January 18, 1887.

Application filed October 2, 1886. Serial No. 215,126. (No model.)

*To all whom it may concern:*

Be it known that I, NATHAN G. SWIFT, a citizen of the United States, residing at Millbrook, in the county of Dutchess and State of New York, have invented certain new and useful Improvements in Farm-Gates; and I do hereby declare the following to be a full, clear, and exact description of the invention, such as will enable others skilled in the art to which it appertains to make and use the same.

My invention consists of a novel construction of farm-gate, which will be fully understood by the following description and claim.

In the accompanying drawings, Figure 1 is a side view of my improved gate, showing the gate closed. Fig. 2 is a similar view showing the gate opened. Fig. 3 is a cross-section of the gate on the line $x\ x$, Fig. 1.

My gate may be constructed with the usual rails, A, B, and C, forming a panel with uprights D and E, and having suitable braces, F, which may be made of plate steel or iron. At the foot of each upright D and E is a traveling roller, as shown at G and H. On the post I is a flanged roller, K, placed higher than the other two rollers, thus allowing the gate to rest continually upon this post-roller and alternately on the two end rollers.

When the gate is shut, it rests on the two rollers G and K, while the roller H is raised from the ground; and when the gate is open it rests on the two rollers H and K, and the roller G is raised from the ground.

By the above-described construction the greater part of the weight of the gate is borne on the middle roller, K, and the gate tilts thereon in opening and closing.

I am aware that rolling gates having three rollers are not new; but I believe it is new to construct a rolling gate, as above described, so that the gate will tilt on the central or middle roller and alternately rest in part on the toe-roller and the heel-roller, as described.

Having thus described my invention, what I claim, and desire to secure by Letters Patent, is—

The combination, with a gate having a roller at each of its lower corners, of a roller pivoted upon the supporting-post at such a height that only one of said corner rollers can rest on the ground at one time, substantially as herein shown and described.

In testimony whereof I affix my signature in presence of two witnesses.

NATHAN G. SWIFT.

Witnesses:
DANIEL BREED,
GEO. H. SHERMAN.